United States Patent [19]

Chang et al.

[11] 4,138,381

[45] Feb. 6, 1979

[54] POLYMERIC THICKENERS, PROCESSES FOR THEIR PREPARATION AND USES THEREOF

[75] Inventors: David C. Chang, Springfield; Michael Fryd, Philadelphia, both of Pa.; Achim R. Krueger, Cherry Hill, N.J.

[73] Assignee: E. I. Du Pont de Nemours and Company, Wilmington, Del.

[21] Appl. No.: 772,864

[22] Filed: Feb. 28, 1977

Related U.S. Application Data

[63] Continuation of Ser. No. 567,942, Apr. 14, 1975, abandoned, which is a continuation-in-part of Ser. No. 416,200, Nov. 15, 1973, abandoned.

[51] Int. Cl.$^2$ .................. C08L 33/08; C08L 33/10
[52] U.S. Cl. .................. 260/29.6 TA; 260/29.6 E; 260/33.4 R; 526/210; 526/317
[58] Field of Search ............ 260/29.6 TA, 29.6 E, 260/33.4 R; 526/210, 317

[56] References Cited

U.S. PATENT DOCUMENTS

| | | | |
|---|---|---|---|
| 3,640,935 | 2/1972 | Abriss | 260/29.6 E |
| 3,652,497 | 3/1972 | Junas et al. | 260/29.6 RW |
| 3,708,445 | 1/1973 | Junas et al. | 260/4 R |
| 3,790,520 | 2/1974 | Ludwig | 260/33.4 R |
| 3,794,608 | 2/1974 | Evani et al. | 260/29.6 E |
| 3,862,075 | 1/1975 | Sekmakas | 260/29.6 E |
| 3,891,591 | 6/1975 | Chang et al. | 260/29.6 RW |
| 3,894,980 | 7/1975 | De Tommaso | 260/29.6 TA |

Primary Examiner—M. J. Welsh

[57] ABSTRACT

Polymeric thickeners are provided in preferred compositions which give both good flow and leveling properties as well as sag resistance to coating compositions such as aqueous paints. The thickeners as prepared comprise a polymer dissolved in a solvent at a concentration up to 50% by weight of the composition, the solvent being at least one glycol and containing during manufacture up to 50% by weight, based on the weight of glycol, of water and the polymer consists essentially of (a) about 10 to 98% by weight of at least one unsaturated carboxylic acid of 3 to 6 carbon atoms, (b) about 1 to 50% by weight of at least one alkyl acrylate or alkyl methacrylate wherein the alkyl group is from 1 to 30 carbon atoms, and (c) about 1 to 85% by weight of at least one ester of the formula

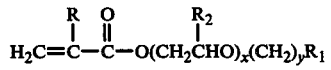

wherein
R and $R_2$ are each hydrogen or methyl,
x is a positive integer of 5 to 80,
y is an integer of 0 to 20, and
$R_1$ is alkyl of 1 to 20 carbon atoms or alkyl phenyl where the alkyl group is from 1 to 20 carbon atoms;
the total adding up to 100%. Processes for preparing the thickeners involve conducting the polymerization in glycol such as ethylene glycol or propylene glycol with or without a little added water.

16 Claims, No Drawings

POLYMERIC THICKENERS, PROCESSES FOR THEIR PREPARATION AND USES THEREOF

CROSS-REFERENCES TO RELATED APPLICATIONS

This is a continuation of application Ser. No. 567,942, filed Apr. 14, 1975, which in turn is a continuation-in-part of application Ser. No. 416,200, filed Nov. 15, 1973, both now abandoned.

BACKGROUND OF THE INVENTION

1. Field of Invention

This invention relates to polymeric solutions, processes for their preparation and aqueous coating compositions containing the polymer of the solutions.

2. Prior Art

In recent years, latex paints, i.e., paints based on aqueous dispersions of synthetic organic polymers, have come into widespread use because they can be easily applied, easily cleaned from brushes and rollers, and because they are generally free of objectionable odor.

Materials known as thickeners are commonly used in latex paints, as well as a variety of other coating compositions, to provide thickening effects. An effective thickener should be used in a minimum amount and should not affect the basic properties of the aqueous coating composition in which it is used.

There are many types of thickeners now used in paints and other coating compositions. Water-soluble materials employed as thickeners include natural gums and resins, such as starch, gum arabic, modified starch products, dextrins, sodium alginates, gums, such as tragacanths and other such compounds. Synthetic materials employed as thickeners include carboxymethylcellulose, polyvinyl alcohol, polyacrylamide, polyacrylic acids and salts thereof, methylcellulose and other cellulose derivatives such as carboxymethylcellulose and hydroxyethylcellulose; polyvinylpyrrolidone, polyvinylmethylether, polyethyleneoxides and copolymers of polyvinylmethylether and maleic anhydride. Thickeners of the polyelectrolyte type function primarily due to adsorption and include synthetic polymeric water-soluble thickeners such as the sodium polyacrylates as well as the copolymers of various acrylates, such acrylic thickeners being described more particularly in U.S. Pat. Nos. 2,883,351, 2,956,046, 3,035,004 and 3,436,378.

Water-soluble polyelectrolyte copolymers employed as thickeners include those esters prepared by the esterification reaction between the acid anhydride groups of a copolymer of an alkylvinylether and maleic anhydride with the terminal hydroxyl groups of a nonionic surfactant of an alkylphenoxyethoxyethanol polymer. The resulting water-soluble polymer is a partial ester which contains free acid groups suitable for subsequent neutralization with a basic material, such as an amine or a metal oxide or hydroxide. The water-soluble polymeric esterification materials are employed as emulsion stabilizers, thickeners and film formers. Interpolymers prepared by the reaction of maleic anhydride with vinyl monomers, which interpolymers are useful as thickeners, are described in U.S. Pat. No. 3,499,876, issued Mar. 10, 1970.

Water-soluble, polymeric surfactant thickeners comprising a copolymer of an ester of an alkylarylpolyether alcohol with an unsaturated carboxylic acid compound are described in U.S. Pat. No. 3,708,445, issued Jan. 2, 1973, to Thomas B. Junas et al. While the specification describes these copolymers as containing 70 to 95% of the ester and 5 to 30% of the acid, the examples appear to be suggesting copolymers of 70 to 95% acid and 5 to 30% of the ester.

SUMMARY OF THE INVENTION

According to the present invention there is provided a composition useful as a thickening agent in aqueous polymeric latices comprising a polymer dissolved in a solvent at a concentration up to 50% by weight of the composition, the solvent being at least one glycol and containing during manufacture up to 50% by weight, based on the weight of glycol, of water and the polymer consisting essentially of (a) about 10 to 98% by weight of at least one unsaturated carboxylic acid of 3 to 6 carbon atoms, (b) about 1 to 50% by weight of at least one alkyl acrylate or alkyl methacrylate wherein the alkyl group is from 1 to 30 carbon atoms, and (c) about 1 to 85% by weight of at least one ester of the formula

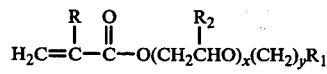

wherein
R and $R_2$ are each hydrogen or methyl,
x is a positive integer of 5 to 80,
y is an integer of 0 to 20, and
$R_1$ is alkyl of 1 to 20 carbon atoms or alkyl phenyl where the alkyl group is from 1 to 20 carbon atoms, the total equaling 100%.

There is also provided a process for preparing the above solution wherein polymerization is conducted in glycol such as ethylene glycol or propylene glycol with 0 to 50% by weight of added water, based on the weight of the glycol (preferably 0 to 30%).

There is further provided an aqueous coating composition wherein a thickening amount of the above polymer from the solution is added to a polymeric latex, preferably containing a filler, a pigment and the like.

DETAILED DESCRIPTION OF THE INVENTION

The present invention provides polymeric thickeners which, when added to coating compositions such as latex paints, will give good flow and leveling after shear but will also have good sag resistance.

The polymeric thickening agent consists essentially of (a) about 10 to 98% by weight (preferably about 20 to 93%, most preferably about 30 to 88%) of at least one unsaturated carboxylic acid of 3 to 6 carbon atoms, (b) about 1 to 50% by weight (preferably about 2 to 30%) of at least one alkyl acrylate or alkyl methacrylate wherein the alkyl group is from 1 to 30 carbon atoms (preferably from 10 to 30 carbon atoms with stearyl methacrylate most preferred) and (c) about 1 to 85% by weight (preferably about 5 to 50%, most preferably about 10 to 40%) of at least one ester of the formula

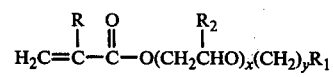

wherein
R and $R_2$ are each hydrogen or methyl,
x is a positive integer of 5 to 80,
y is 0 or a positive integer of 1 to 20, and $R_1$ is alkyl of 1 to 20 carbon atoms or alkyl phenyl where the alkyl group is from 1 to 20 carbon atoms.

Useful unsaturated carboxylic acid monomers are ethylenically unsaturated and include mono and dicarboxylic acids such as acrylic acid, methacrylic acid, itaconic acid, maleic acid, fumaric acid, crotonic acid, angelic acid, glutaconic acid and the like. Half-esters of the dicarboxylic acids with alkanols (preferably $C_1$–$C_8$) can also be used. Acrylic acid and methacrylic acid are especially preferred.

Some of the ester monomers used in the polymeric thickener are commercially available. Generally, the ester monomers can be prepared as described in U.S. Pat. No. 3,708,445 using alcohols and acids described in column 3, lines 36–75. Transfer esterification, as is well known in the art, can also be used.

A preferred ester has the formula:

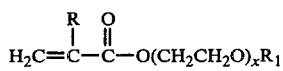

wherein
R is hydrogen or methyl,
x is a positive integer of 5 to 80, preferably 10 to 50, and
$R_1$ is alkyl of 1 to 15 carbon atoms or alkyl phenyl where the alkyl group is from 8 to 20 carbon atoms, preferably

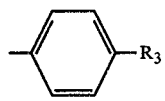

where $R_3$ is alkyl of 8 to 20 carbon atoms.
Generally, the higher the ester content in the polymer, the better the flow in the final coating composition.

Particularly preferred polymeric thickeners use methacrylic acid, stearyl methacrylate and an acrylate of the formula:

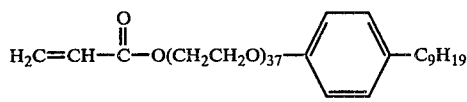

as monomers.

The polymeric thickeners of the invention have a number of advantages. They are stable, compatible, high efficiency thickeners for latex systems. Thickener properties can be controlled through compositional variation and solvent modification. Tailoring the thickeners will provide the latex systems with desirable balance of application properties. For example, the high shear rate viscosity (controls film build and brush drag), the medium shear rate viscosity (controls brush load and dripping) and low shear rate viscosity (controls flow and leveling and sag resistance) can be adjusted to the desirable range depending on the type of latex, e.g., paint, prepared, i.e., wall paint, house paint, trim paint, etc. A high shear rate is greater than 5,000 sec.$^{-1}$, a medium shear rate is in the range of 50–300 sec.$^{-1}$ and a low shear rate is lower than 10 sec.$^{-1}$.

The polymeric thickeners are prepared by polymerizing the monomers under an inert atmosphere, such as nitrogen, with a typical free-radical catalyst in glycol such as ethylene glycol, propylene glycol (both 1,2 and 1,3), glycerol, diethylene glycol, triethylene glycol, tetraethylene glycol and other polyethylene glycols. Other glycols such as monoalkyl ether glycols, where the alkyl group is from 1 to 4 carbon atoms such as the cellosolves can be used. Cellosolve derivatives such as cellosolve acetate can also be used. Of these, propylene glycol is preferred. The process is also useful for preparing the polymer without the alkyl acrylate or alkyl methacrylate, particularly the bipolymers consisting essentially of about 30 to 65% by weight of an unsaturated carboxylic acid, such as methacrylic acid, and about 70 to 35% by weight of the defined esters. Up to 50% by weight of the glycol (preferably up to 30%) can be replaced by water. For some unknown reason, the use of added water in the process produces a polymeric thickener that lowers brush drag when the thickener is used in paints. Latex systems such as paints incorporating the thickeners of the same composition but prepared through this solvent modification, will have different high shear viscosity and/or low shear rate viscosity while the medium shear rate viscosity stays at about the same level.

The process is specifically carried out by adding a portion of the monomers (preferably about 10 to 50% by weight of the total amount of monomers) to a reaction vessel containing the glycol with or without added water. Sufficient glycol is used in order to give a final polymer concentration of less than 50% by weight, preferably less than about 35%. The final polymer concentration range will usually be between 5 and 35% by weight.

The reaction mixture in the vessel is then heated to a temperature of at least 50° C. before the free-radical catalyst is added. Of course, the temperature cannot be higher than the boiling point of the glycol used or the glycol-water azeotrope. It is preferred that the temperature be between 70 and 110° C.

While any convenient free-radical catalyst can be used, preferred catalysts are of the azo type such as azodiisobutyronitrile, azobisdimethylvaleronitrile, azobisisobutyronitrile, azodiisobutyramide, azobis($\alpha$-ethylbutyronitrile) or azobis($\alpha,\gamma$-dimethylcapronitrile). Other free-radical catalysts such as organic hyperoxides and peroxides can be used. Illustrative hyperoxides are t-butyl hydroperoxide, cume hydroperoxide, diisopropylbenzene hydroperoxide, p-menthane hydroperoxide, pinane hydroperoxide and other t-alkyl hydroperoxide. Some useful peroxides are benzoyl peroxide, acetyl peroxide, lauroyl peroxide, di-t-butyl perphthalate, t-butyl perbenzoate and methyl ethyl ketone peroxide. While high energy radiation sources, such as ultraviolet light, x-rays or gamma-rays, can be used, they are not preferred. Initially, only a portion of the total catalyst (preferably about 10 to 50% by weight) is added to the initial charge of monomers.

After polymerization has been initiated, the remainder of the monomers (either separately or as a mixture) and catalyst are continuously fed into the reaction vessel at a constant rate which depends upon volume and time. Constant temperature is maintained either by heating or cooling as the case may be. Generally, the reaction time will be between 1 and 3 hours at the preferred temperatures.

After the addition of the monomers and catalyst is completed, a small amount (typically about 0.6%) of catalyst is added to insure complete polymerization.

Heating of the reaction mixture is continued for about another 1 to 4 hours, after which it is cooled.

The pH of the reaction mixture after polymerization will be around 6 or below. Where desired, such as when the polymeric thickeners are to be added to paints or other compositions of high pH, the pH of the reaction mixture is adjusted by adding a basic material to the segregated polymer per se or to the reaction mixture. Usually the pH will be adjusted to pH 7 to 10 by the addition of ammonia with or without additional water depending upon the polymer and solvent compositions. However, other bases which are water-soluble, such as a metal oxide or hydroxide, e.g., alkali metal or alkaline earth metal hydroxides and ammonium hydroxide, can be used. Another preferred base besides ammonia is a volatile nitrogenous base having a vapor pressure greater than about $1 \times 10^{-4}$ millimeters of mercury at 25° C. such as monoethanolamine, diethanolamine, propanolamine, morpholine, pyrrolidine or piperidine. Ammonia is especially preferred for its volatility and low cost.

The polymers per se or their solutions are used for controlling the viscosity of polymeric latices of natural or synthetic water-insoluble polymers. It is preferred that the solutions, as prepared, be used to thicken the polymeric latices. However, the polymers can be isolated from the solutions as solid products which can be added to the polymeric latices. The solutions can be further diluted with water to lower solids content and the dilute solutions added to the latices. Also, the polymers can be dispersed in another liquid medium or dissolved in another solvent through a solvent exchange before they are added to the latices. The particular technique used will depend on the type latex to be thickened.

Illustrative polymeric latices are dispersions, emulsions, suspensoids and the like of the following polymers: acrylics, vinyl acetate homopolymers or copolymers, styrene-butadiene, carboxylated styrene-butadiene, polystyrene, polyvinyl alcohol, natural rubber, vinyl chloride homopolymers and copolymers, chloroprene, polyacrylonitrile, acrylonitrile-butadiene and butyl rubber. More particular polymers are homopolymers and copolymers of acrylonitrile with a diene like isoprene, butadiene or chloroprene; homopolymers of styrene, homopolymers and copolymers of vinyl halide resins like vinyl chloride, vinylidene chloride, with each other or acrylonitrile or vinyl esters such as vinyl acetate; vinyl acetate homopolymers and copolymers with ethylene and acrylates; copolymers of styrene and unsaturated acid anhydrides like maleic anhydrides; homopolymers and copolymers of acrylic and methacrylic acid and their esters and derivatives; polybutadiene; polyisoprene; ethylenepropylene copolymers; olefinic resins like polyethylene, polypropylene; polyvinyl alcohol; carboxylated natural and synthetic latices and similar polymeric materials. Acrylic polymer latices are preferred. An amount of thickener sufficient to give a thickening effect is used. Generally, the concentration of thickener will be between 0.1 and 10% by weight of the solids, preferably between 0.5 and 5%.

The thickener of the invention is particularly useful in improving the sag resistance and flow and leveling of aqueous polymeric latices and latex paints, particularly those acrylic paints described in U.S. Pat. No. 3,309,331, issued Mar. 14, 1967 to McDowell and Hill and U.S. Pat. No. 3,687,885, issued Aug. 29, 1972 to Abriss and McDowell. The disclosures of these patents with respect to particularly useful acrylic polymeric dispersions are hereby incorporated by reference.

In preparing coating compositions, particularly paints, pigments as well as other conventional paint ingredients can be added to the coating compositions of the invention. Conventional pigments can be used either alone or in combination. Illustrative are rutile titanium dioxide, anatase titanium dioxide, carbon black, lamp black, finely divided kaolin clays, chrome yellow, chrome green, black iron oxide, "Monastral" green pigment, "Monastral" blue pigment, "Dalamar" yellow pigment, lithopone and the like. These pigments can be extended with conventional extenders such as diatomaceous silica, calcium carbonate, barium sulfate, talc, various clays, mica and the like.

Other conventional adjuncts can also be added to the coating compositions. For example, glycols such as ethylene glycol or propylene glycol can be added to paints at concentrations of up to 30% by weight, to increase their wet-edge time and to further improve their lapping characteristics. The glycol can be added directly to the paint or it can be carried over from the preparation of the polymeric thickener. In other words, when glycol is used in the paint, there is no need to separate the polymeric thickener from the glycol reaction medium. Defoamers, pigment dispersants, microbiocides, other thickeners and the like, in the usual amounts.

The invention can be further illustrated by the following examples in which parts and percentages are by weight unless otherwise indicated.

EXAMPLE 1

A polymeric thickener of the composition 87% methacrylic acid, 2.6% stearyl methacrylate and 10.4% of an acrylic ester of the formula

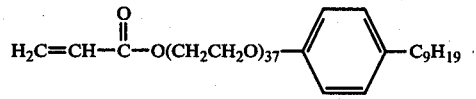

(NPEOA) was prepared as follows:

|  | Ingredients | Parts by Weight |
| --- | --- | --- |
| Charge 1: | Propylene glycol | 1637 |
| Charge 2: | Methacrylic acid (MAA) | 424 |
|  | Stearyl methacrylate (SMA) | 13 |
|  | NPEOA | 51 |
|  | Propylene glycol | 57 |
| Charge 3: | Azobisisobutyronitrile | 3.5 |
|  | Acetone | 12 |
| Charge 4: | Azobisisobutyronitrile | 6.7 |
|  | Acetone | 24 |
|  |  | 2228.2 |

Charge 1 was placed in a 3-liter 3-neck flask equipped with stirrer, condenser, thermometer, nitrogen gas inlet and outlet and an addition funnel. Charge 1 was blanketed with nitrogen and heated to about 94° C. One-fourth of Charge 2 and one-fourth of Charge 3 were added and the temperature held for about 5 minutes. The remainder of Charges 2 and 3 were mixed and fed at a constant rate over a period of 80 minutes and then held at 94° C. for 15 minutes.

Charge 4 was then added in four equal portions at 30 minute intervals. The flask ingredients were cooled and discharged.

To 400 parts of the above composition was added 220 parts of water and 50 parts of a 30% ammonia solution. This solution contained about 15% polymeric thickener.

A flat paint was prepared having the following approximate composition:

| Ingredients | % by Weight |
|---|---|
| Anatase TiO$_2$ | 4.7 |
| Rutile TiO$_2$ | 22.1 |
| Magnesium silicate | 8.2 |
| Mica | 8.2 |
| Thickener of Example 1 | 0.4 |
| Anionic surfactant (Nopco® 1497-V) | 0.21 |
| Binder MMA/2EHA/MAA[1] 44/54/2 | 11.3 |
| Potassium tripolyphosphate | 0.13 |
| Defoamer (DeeFo® 495) | 0.05 |
| Preservative with 1,2-benzisothiazolin-3-one | 0.01 |
| Nonionic surfactant[2] | 0.4 |
| Sodium polycarboxylate (Tamol® 850) | 0.1 |
| Ammonia | 0.4 |
| Water | 41.3 |
| Ethylene glycol | 2.5 |
| | 100.00 |

[1]MMA = methyl methacrylate
2EHA = 2-ethylhexyl acrylate
MAA = methacrylic acid

[2] where n is mixture about 9–10 and about 45.

The resulting paint had about 56% solids and a pigment volume concentration (PVC) of about 52. The pH was about 9.5.

The paint had a consistency of 104 K.U. (Krebs Units) when measured by a Stormer as set forth in ASTM D-562-55. The viscosity, in poises, of the paint was measured at various shear rates on an ICI Cone and Plate Viscometer for 16,000 sec.$^{-1}$ and on a Rotavisco MV-1 for the others. Results of the tests are shown in Table I.

TABLE I

| Shear Rate Sec.$^{-1}$ | Viscosity Poises |
|---|---|
| 16,000 | 2.6 |
| 300 | 9.5 |
| 75 | 13.5 |
| 10 | 21 |
| 1 | 29 |
| 0.2 | 33 |

The N.Y.C.P. leveling test (ASTM D-2801-69) blade score (scale 0-10) was 7 and the Shell sag blade score (scale 2-8) was 6. The Shell sag test is defined by W. W. Reynolds and E. C. Larson, Paint Varnish Production 48, No. 9, 31-4 (1958).

EXAMPLE 2

A polymeric thickener of the composition 86.8% methacrylic acid, 2.6% stearyl methacrylate and 10.6% of a methacrylate ester of the formula:

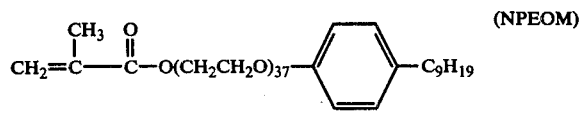 (NPEOM)

was prepared as follows:

| | Ingredients | Parts by Weight |
|---|---|---|
| Charge 1: | Propylene glycol | 827 |
| Charge 2: | Methacrylic acid (MAA) | 280 |
| | Stearyl methacrylate (SMA) | 9 |
| | Propylene glycol | 25 |
| Charge 3: | NPEOM | 34 |
| | Water | 35 |
| | Propylene glycol | 111 |
| Charge 4: | Azobisisobutyronitrile | 2.2 |
| | Acetone | 16 |
| | | 1339.2 |

The procedure of Example 1 was followed except ⅜ of Charge 4 was added when the temperature reached 94° C. Temperature was then held for 5 minutes. A mixture of 3/8 of Charge 4 added to the remainder of Charge 2 was added simultaneously with the balance of Charge 3 at a constant rate over a period of 80 minutes. The temperature was then held for 15 minutes. The remainder of Charge 4 (¼) was added in four equal portions at intervals of 30 minutes. After the final addition, the temperature was held 30 minutes, the contents cooled and then discharged.

To 300 parts of the above composition was added 150 parts of water and 45 parts of a 30% aqueous ammonia solution. This solution contained about 15% polymeric thickener.

The flat paint of Example 1 was prepared. It had a consistency of 106 K.U., an N.Y.C.P. leveling score of 6 and a Shell sag score of 6. The viscosity-shear rate relationship is shown in Table II.

TABLE II

| Shear Rate Sec.$^{-1}$ | Viscosity Poises |
|---|---|
| 16,000 | 1.7 |
| 300 | 8 |
| 75 | 12 |
| 10 | 21 |
| 1 | 32 |
| 0.2 | 40 |

EXAMPLE 3-7

Following the thickener preparation procedure of either Example 1 or Example 2, thickeners were prepared and formulated into the flat paint of Example 1. In Examples 4–6, however, additional water was not added with the 30% aqueous ammonia solution. For controls, various standard thickeners were formulated into the flat paint of Example 1 at about the same concentration. For example, Control A used methocel, Control B used "Thickener LN" (sold by GAF Corp.) which is stated to be the ammonium salt of the partial ester of 2 parts of methylvinyl ether/maleic anhydride 1/1 copolymer and 1 part of a polyoxyethylated lauryl alcohol having 16 moles of ethylene oxide units per mole of alcohol units, and Control C used a commercial thickener sold by General Latex and Chemical Corp. under the tradename "Vultex" T-60 which is believed to be a thickener of the type described in U.S. Pat. No. 3,708,445.

The thickener composition, the solvent used in preparation, the paint viscosity-shear rate data, the N.Y.C.P. leveling score and Shell sag score are shown in Table III. The effect of the use of water in the solvent on the paint rheology can be seen by comparing Examples 4 and 6.

TABLE III

| Example No. | Thickener Composition | | | | Solvent | K.U. | Viscosity-Poises at Various Shear Rates | | | | | | Leveling | Sag |
|---|---|---|---|---|---|---|---|---|---|---|---|---|---|---|
| | MAA | SMA | NPEOA | NPEOM | | | 16M | 300 | 75 | 10 | 1 | 0.2 | | |
| 3 | 86.8 | 2.6 | — | 10.6 | Prop.gly.& 21% H$_2$O | 109 | 2.3 | 9 | 14 | 24 | 43 | 62 | 6 | 8 |
| 4 | 41.5 | 21.2 | — | 37.3 | Prop.gly.& 14% H$_2$O | 100 | 0.6 | 6.5 | 12 | 25 | 44 | 56 | 6 | 8 |
| 5 | 30 | 35 | 35 | — | Prop.gly. | 102 | 3.2 | 9.2 | 13.5 | 18 | 19 | 19 | 6 | 2 |
| 6 | 41.7 | 21.3 | 37 | — | Prop.gly. | 101 | 1.2 | 7.6 | 13 | 21 | 32 | 38 | 7 | 6 |
| 7 | 89 | 10 | 1 | — | Prop.gly. | 99 | 1.0 | 5.5 | 11.5 | 32 | 140 | 550 | 0 | 8 |
| Control A | — | — | — | — | — | 104 | 0.8 | 4.4 | 10 | 38 | 200 | 750 | 0 | 8 |
| Control B | — | — | — | — | — | 98 | 0.8 | 6.5 | 10.5 | 22 | 50 | 70 | 2 | 8 |
| Control C | — | — | — | — | — | 108 | 0.9 | 6 | 12.5 | 40 | 160 | 500 | 0 | 8 |

EXAMPLES 8–15

The thickeners of Examples 1–7, a thickener of 41.7% methacrylic acid, 21.3% stearyl methacrylate and 37% NPEOM prepared according to the procedure of Example 2 with 30.8% water (Example 15) and methocel (Control D) were formulated into a semi-gloss paint having the following approximate composition:

| Ingredients | % by Weight |
|---|---|
| Rutile TiO$_2$ | 27.5 |
| Thickener | 0.6 |
| Tributyl phosphate | 0.2 |
| Binder MMA/2EHA/MAA/AEMA[1] 47.5/49.5/2.5/0.5 | 16.2 |
| Potassium tripolyphosphate | 0.2 |
| Defoamer (DeeFo® 495) | 0.05 |
| Preservative (a zinc pyridine thione) | 0.01 |
| Gelling agent (Collojds 581-B) | 0.2 |
| Non-ionic surfactant[2] | 0.2 |
| Sodium polycarboxylate | 0.21 |
| Ammonia | 0.6 |
| Water | 46.33 |
| Propylene glycol | 7.7 |
| | 100.00 |

[1] AEMA = aminoethylmethacrylate
[2] Surfactant of Example 1 where n is 9–10.

The resulting paint had about 45% solids, a PVC of about 30 and a pH of about 9.5.

The paint viscosity-shear rate data, the N.Y.C.P. leveling score and the Shell sag score are shown in Table IV.

TABLE IV

| Example No. | Thickner Used | K.U. | Viscosity-Poises at Various Shear Rates | | | | | | Leveling | Sag |
|---|---|---|---|---|---|---|---|---|---|---|
| | | | 16M | 300 | 75 | 10 | 1 | 0.2 | | |
| 8 | Ex. 1 | 104 | 2.41 | 11 | 14 | 21 | 23 | 24 | 6 | 2 |
| 9 | Ex. 2 | 100 | 1.25 | 8 | 12.5 | 20 | 22 | 23 | 6 | 5 |
| 10 | Ex. 3 | 104 | 1.55 | 8 | 14 | 22 | 37 | 48 | 6 | 5 |
| 11 | Ex. 4 | 110 | 0.5 | 8 | 14 | 30 | 50 | 120 | 4 | 4 |
| 12 | Ex. 5 | 99 | 2.05 | 9.2 | 13 | 16 | 20 | 22 | 8 | 3 |
| 13 | Ex. 6 | 102 | 0.89 | 8 | 13 | 20 | 26 | 30 | 6 | 5 |
| 14 | Ex. 7 | 101 | 0.72 | 6 | 13.5 | 30 | 60 | 90 | 4 | 8 |
| 15 | — | 108 | 0.30 | 6 | 13 | 25 | 60 | 140 | 1 | 8 |
| D | — | 110 | 0.69 | 5.5 | 13 | 41 | 330 | 1200 | 0 | 8 |

EXAMPLE 16

Following the procedure of Example 1, a thickener was prepared containing 41.6% methacrylic acid, 21.4% methyl methacrylate and 37% of NPEOA.

When the above thickener was formulated into the paint of Example 1, it had a consistency of 100 K.U., an N.Y.C.P. leveling score of 6 and a Shell sag score of 8. Flow and leveling by brush-out was judged to be excellent. The viscosity-shear rate relationship is shown in Table V.

TABLE V

| Shear Rate Sec.$^{-1}$ | Viscosity Poises |
|---|---|
| 16,000 | 0.8 |
| 300 | 4.8 |
| 75 | 8.0 |
| 10 | 15.0 |
| 1 | 25.0 |
| 0.2 | 29.0 |

EXAMPLE 17

Using the procedure of Example 2 with 29% water, a thickener was prepared containing 11% methacrylic acid, 11% stearyl methacrylate and 78% NPEOM.

This thickener was formulated into the paint of Example 1 and had a consistency of 107 K.U., an N.Y.C.P. leveling score of 2 and a Shell sag score of 8. Flow and leveling by brush-out was judged to be fair to good. The viscosity-shear rate relationship is shown in Table VI.

TABLE VI

| Shear Rate Sec.$^{-1}$ | Viscosity Poises |
|---|---|
| 16,000 | 0.4 |
| 300 | 3.0 |
| 75 | 4.6 |
| 10 | 12.0 |
| 1 | 30.0 |
| 0.2 | 57.0 |

EXAMPLE 18

The procedure of Example 1 was used to prepare a thickener containing 52% methacrylic acid, 11% stearyl methacrylate and 37% NPEOA except cellosolve acetate (polyurethane grade 99%) was used in place of the propylene glycol. After neutralization with ammonia, the top layer of cellosolve acetate was decanted.

This thickener was formulated into the paint of Example 1 and had an N.Y.C.P. leveling score of 3 and a Shell sag score of 8. Flow and leveling by brush-out was judged good. The viscosity-shear rate relationship is shown in Table VII.

TABLE VII

| Shear Rate Sec.$^{-1}$ | Viscosity Poises |
|---|---|
| 16,000 | 1.4 |
| 300 | 9.4 |
| 75 | 14.5 |
| 10 | 28.0 |
| 1 | 52.0 |
| 0.2 | 95.0 |

EXAMPLES 19-20

Using the procedure of Example 1, a thickener was prepared containing 91.5% methacrylic acid, 2.5% stearyl methacrylate and 6% of an acrylate of the formula:

$$CH_2=CHC-O(CH_2CH_2O)_{12}-C_{13}H_{27}$$

A paint was prepared using the above thickener with the following approximate composition:

| Ingredients | % by Weight |
|---|---|
| Rutile TiO$_2$ | 27.3 |
| Tributyl phosphate | 0.2 |
| Thickener | 0.6 |
| Binder MMA/2EHA/MMA/AEMA 45/53/1.5/0.5 | 16.1 |
| Potassium tripolyphosphate | 0.2 |
| Defoamer (DeeFo ® 495) | 0.1 |
| Preservative (a zinc pyridine thione) | 0.01 |
| Gelling agent (Colloids 581-B) | 0.2 |
| Non-ionic surfactant (Examples 8-15) | 0.16 |
| Sodium polycarboxylate | 0.21 |
| Ammonia | 0.6 |
| Water | 46.52 |
| Ethylene glycol | 0.1 |
| Ethylene glycol | 0.1 |
| Propylene glycol | 7.7 |
| | 100.00 |

The resulting paint had a solids content of about 45%, a PVC of about 29, a pH of about 9.5 and a consistency of 104 K.U. Flow and leveling by brush-out was judged to be good and brush drag judged to be slight.

By comparison, the thickener of Example 1 (87% MAA, 2.6% SMA and 10.4% NPEOA) when added to the above-described paint had a consistency of 104 K.U. and was judged to be excellent in flow and leveling by brush-out. Brush drag was judged to be moderate.

EXAMPLE 21

The procedure of Example 1 was used to prepare a thickener of 78.6% methacrylic acid, 2.4% stearyl methacrylate and 19% of an acrylate of the formula:

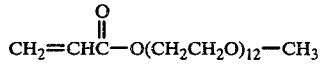

$$CH_2=CHC-O(CH_2CH_2O)_{12}-CH_3$$

This thickener was incorporated into the paint of Examples 19-20 to give a paint having a consistency of 98 K.U. Flow and leveling by brush-out was judged to be fair and brush drag was judged to be very slight.

Similar results were obtained when this same thickener was prepared in ethylene glycol instead of propylene glycol, except the paint was judged to have poor flow and leveling as determined by brush-out and judged to have no brush drag.

What is claimed is:

1. A liquid composition useful as a thickening agent in polymeric latices, the composition comprising
   (A) up to 50%, by weight of the composition, of a polymer of polymerized units of
   (1) about 10–98%, by weight of the polymers, at least one unsaturated carboxylic acid of 3-6 carbon atoms;
   (2) about 1–50%, by weight of the polymer, at least one alkyl acrylate or alkyl methacrylate whose alkyl group contains 1-30 carbon atoms; and
   (3) about 1–85%, by weight of the polymer, at least one ester of the formula

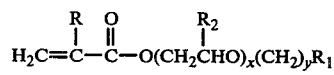

$$H_2C=C-C-O(CH_2CHO)_x(CH_2)_yR_1$$

where
R and R$_2$ are hydrogen or methyl;
R$_1$ is an alkyl radical or an alkyl phenyl radical of 1-20 carbon atoms;
x is 5-80; and
y is 0-20; the total of 1, 2 and 3 being 100%; and
(B) as a solvent for (A),
   (4) a glycol, or
   (5) a glycol containing up to 50% of its weight of water; the composition being made by
   (a) adding 10-50%, by weight of the total weight of monomers to be used, to a reaction vessel containing enough glycol, or glycol containing up to 50% of its weight of water, to give a final polymer concentration of less than 50% by weight;
   (b) heating the contents of the vessel to at least 50° C.;
   (c) adding a portion of the free-radical catalyst to be used to the vessel; and then
   (d) continuously adding the remainder of the monomers and catalyst to the vessel, and
   (e) adding ammonia or a water-soluble organic amine after the polymerization is complete to adjust the pH to about 7 to 10.

2. The composition of claim 1 wherein (a) is about 20 to 93% by weight, (b) is about 2 to 30% by weight and (c) is about 5 to 50% by weight.

3. The composition of claim 1 wherein the unsaturated carboxylic acid is acrylic acid or methacrylic acid.

4. The composition of claim 1 wherein the alkyl acrylate or alkyl methacrylate contains 10 to 30 carbon atoms in the alkyl group.

5. The composition of claim 1 wherein the ester of (c) has the formula

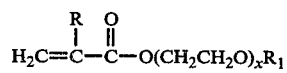

$$H_2C=C-C-O(CH_2CH_2O)_xR_1$$

wherein
R is hydrogen or methyl,
x is a positive interger of 5 to 80, and
R$_1$ is alkyl of 1 to 15 carbon atoms or alkyl phenyl where the alkyl group is from 8 to 20 carbon atoms.

6. The composition of claim 5 wherein the polymer is at a concentration of 5-35% by weight of the composition, (a) is about 20 to 30% by weight and (c) is about 5 to 50% by weight, the glycol is selected from the group consisting of ethylene glycol and propylene glycol, and the water is present during manufacture at a concentration up to 30% by weight, based on the weight of the glycol.

7. The composition of claim 6 wherein the unsaturated carboxylic acid is acrylic acid or methacrylic acid and the alkyl acrylate or alkyl methacrylate contains 10 to 30 carbon atoms in the alkyl group.

8. The composition of claim 7 wherein (a) is about 30 to 88% by weight, (b) is about 2 to 30% by weight and (c) is about 10 to 40% by weight.

9. A process for preparing a polymer useful as a thickening agent in aqueous polymeric latices comprising:
(a) adding to a reaction zone a portion of the monomers and sufficient ethylene glycol or propylene glycol, with 0 to about 50% by weight of water based on the weight of glycol, to give a final product having a solids content less than about 50% by weight, said monomers consisting essentially of (i) about 10 to 98% by weight of at least one unsaturated carboxylic acid of 3 to 6 carbon atoms, (ii) about 1 to 50% by weight of at least one alkyl acrylate or alkyl methacrylate wherein the alkyl group is from 1 to 30 carbon atoms, and (iii) about 1 to 85% by weight of at least one ester of the formula

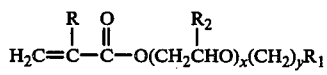

wherein
R and $R_2$ are each hydrogen or methyl,
x is a positive integer of 5 to 80,
y is an integer of 0 to 20, and
$R_1$ is alkyl of 1 to 20 carbon atoms or alkyl phenyl where the alkyl group is from 1 to 20 carbon atoms;
(b) heating the mixture of (a) to a temperature of at least about 50° C.;
(c) adding to the reaction zone a portion of a free-radical polymerization catalyst; and
(d) feeding to the reaction zone the remainder of the monomers and catalyst; and
(e) adding ammonia or a water-soluble organic amine after the polymerization is complete to adjust the pH to about 7 to 10.

10. The process of claim 9 wherein the temperature in step (b) is in the range of 50° C. to the boiling point of the glycol or glycol-water azeotrope.

11. The process of claim 10 wherein the temperature is about 70 to 110° C.

12. The process of claim 10 wherein the portion of monomers initially added to the reaction zone is about 10 to 50% of the total.

13. The process of claim 12 wherein the monomers consist essentially of about 20 to 93% by weight of (i), about 2 to 30% by weight of (ii) and about 5 to 50% by weight of (iii).

14. A process for preparing a polymer useful as a thickening agent in aqueous polymeric latices comprising:
(a) adding to a reaction zone about 10 to 50% by weight of the total of the monomers and sufficient ethylene glycol or propylene glycol, with 0 to about 30% by weight of water based on the weight of glycol, to give a final product having a solids content less than about 35% by weight, said monomers consisting essentially of (i) about 20 to 93% by weight of acrylic acid or methacrylic acid, (ii) about 2 to 30% by weight of an alkyl acrylate or alkyl methacrylate where the alkyl group is from 10 to 30 carbon atoms and (iii) about 5 to 50% by weight of an ester of the formula

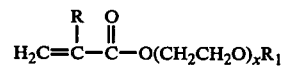

wherein
R is hydrogen or methyl,
x is a positive integer of 5 to 80, and
$R_1$ is alkyl of 1 to 15 carbon atoms or alkyl phenyl where the alkyl group is from 8 to 20 carbon atoms;
(b) heating the mixture of (a) to a temperature in the range of about 70 to 110° C.;
(c) adding to the reaction zone about 2 to 50% by weight of the total of a free-radical polymerization catalyst;
(d) continuously feeding to the reaction zone the remainder of the monomers and catalyst; and
(e) adding ammonia or a water-soluble organic amine after the polymerization is complete to adjust the pH to about 7 to 10.

15. The process of claim 14 wherein the ester has the formula

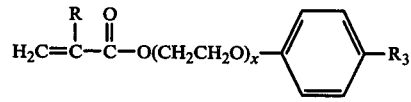

wherein
R is hydrogen or methyl,
x is a positive integer of 10 to 50, and
$R_3$ is an alkyl group of 8 to 20 carbon atoms.

16. A process for preparing a polymer useful as a thickening agent in aqueous polymeric latices comprising: polymerizing monomers consisting essentially of (i) about 10 to 98% by weight of at least one unsaturated carboxylic acid of 3 to 6 carbon atoms, (ii) about 1 to 50% by weight of at least one alkyl acrylate or alkyl methacrylate wherein the alkyl group is from 1 to 30 carbon atoms, and (iii) about 1 to 85% by weight of at least one ester of the formula

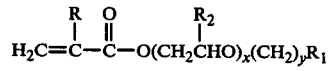

wherein
R and $R_2$ are each hydrogen or methyl,
x is a positive integer of 5 to 80,
y is an integer of 0 to 20, and
$R_1$ is alkyl of 1 to 20 carbon atoms or alkyl phenyl where the alkyl group is from 1 to 20 carbon atoms with a free-radical catalyst in sufficient glycol, with 0 to 50% by weight of water based on the weight of glycol, to give a final polymer solids concentration less than about 50% by weight.

* * * * *